United States Patent [19]

Loskorn et al.

[11] 4,455,622
[45] Jun. 19, 1984

[54] BIT-ORIENTED LINE ADAPTER SYSTEM

[75] Inventors: Richard A. Loskorn; Philip D. Biehl, both of Dana Point; Robert D. Catiller, Garden Grove, all of Calif.

[73] Assignee: Burroughs Corporation, Detroit, Mich.

[21] Appl. No.: 355,134

[22] Filed: Mar. 5, 1982

[51] Int. Cl.³ .............................................. G06F 3/00
[52] U.S. Cl. ................................................... 364/900
[58] Field of Search ......................................... 364/900

[56] References Cited

U.S. PATENT DOCUMENTS 4,343,461 7/1983 Holtey et al. ...................... 364/900

*Primary Examiner*—Raulfe B. Zache
*Attorney, Agent, or Firm*—Alfred W. Kozak; Nathan Cass; Kevin R. Peterson

[57] ABSTRACT

A line adapter unit working in conjunction with a microprocessor which serves to handle data transmission using the bit oriented protocol mode. The microprocessor can select any one of a plurality of input-output circuit units which provide specific control of communications to/from remote data terminals or data sets. The microprocessor can select and control various components of the input-output circuit means such as regulating the timing means and setting up command structures for controlling the type, the direction, and the conversion of serial bit data. Likewise, each component of an input-output circuit unit may request service via an interrupt to the microprocessor and receive a command or response required for further operations. Each input-output circuit unit is provided with a dedicated memory area associated with a given data communications line. An automatic calling unit output register is also provided which can receive signals from the microprocessor which can be used for automatic dialing of the remote data sets.

13 Claims, 5 Drawing Figures

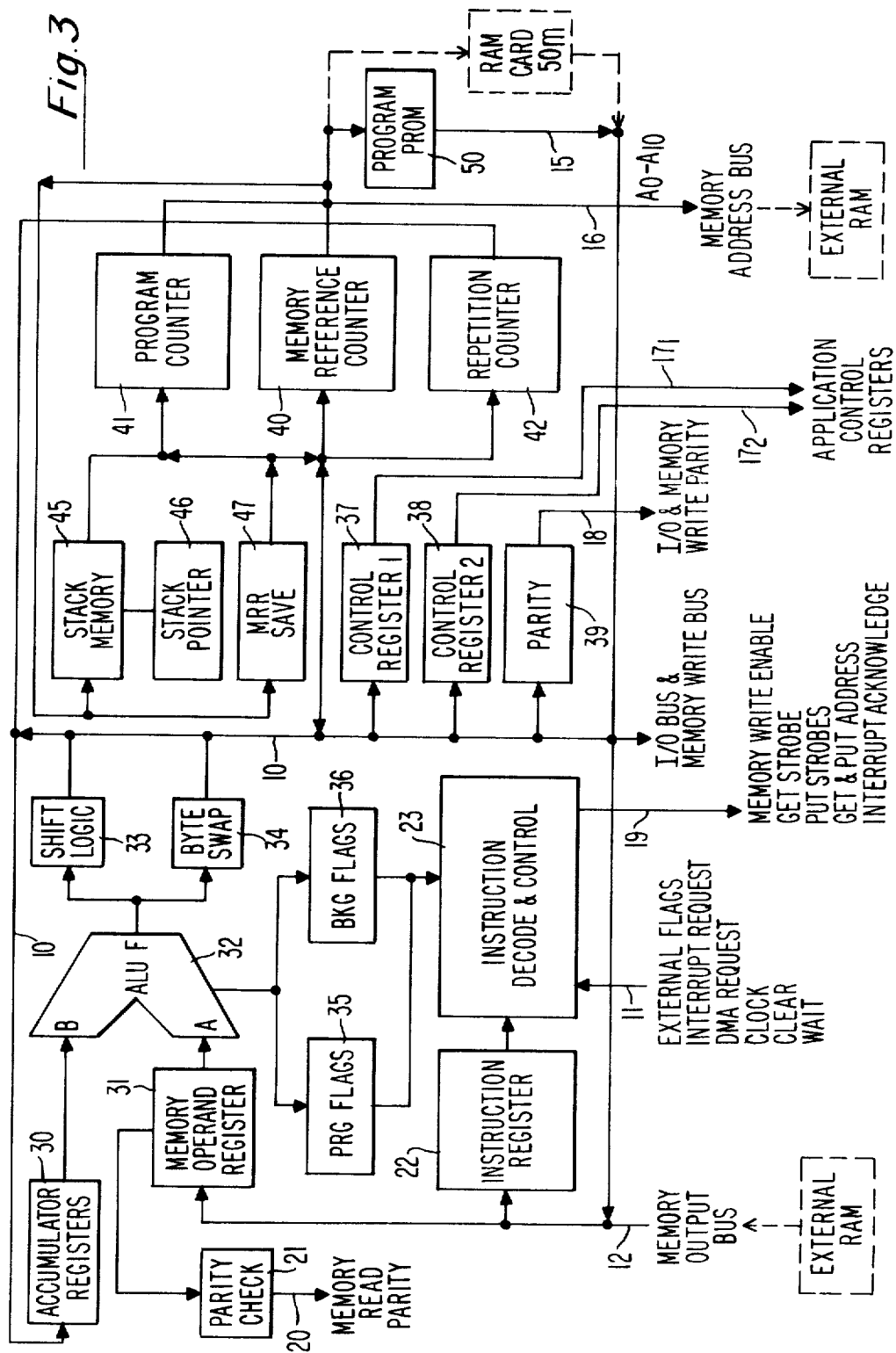

BIT-ORIENTED LINE ADAPTER SYSTEM

FIELD OF THE INVENTION

This disclosure relates to data communication systems and the use of line adapter units used to perform specific functions in the system.

CROSS REFERENCES TO RELATED APPLICATIONS

This disclosure is also related to an application entitled "Byte Oriented Line Adapter System", inventors Richard A. Loskorn, Philip D. Biehl, Robert D. Catiller.

Incorporated by reference are several patents which form a background and explanation for the use of the line adapters of this disclosure. These patents, which are included by reference are:

U.S. Pat. No. 4,293,909 entitled "Digital System for Data Transfer Using Universal Input-Output Microprocessor";

U.S. Pat. No. 4,291,372 entitled "Microprocessor System With Specialized Instruction Format";

U.S. Pat. No. 292,667 entitled "Microprocessor System Facilitating Repetition of Instructions";

U.S. Pat. No. 4,189,769 entitled "Input-Output Subsystem for Digital Data Processing System".

BACKGROUND OF THE INVENTION

Data communication systems and the elements thereof involve the electronic transmission of encoded information or data from one point to another. In order to provide for the orderly and accurate transfer of data between elements and digital systems, certain roles of transmission are established which are called "protocols". These factors are often called data link control protocols (DLCs) which are the established roles required for communication between terminals and computers over the communication channels involved. These data link control protocols provide the function of establishing and terminating connections between stations; ensuring message integrity through error detection; providing requests for retransmission; giving positive and negative acknowledgments; providing for identification of the sender and receiver by means of polling or selection procedures; and providing special control functions, such as "requests for status", "station reset", "reset acknowledge", "start", "start acknowledge" and "disconnect".

The data link control protocols may be classified in certain categories, such as (i) byte control protocols (BCPs) and (ii) bit-oriented protocols (BOPs). With the "byte control protocols", a defined set of communication control characters monitors the orderly operation of the data link and these control characters are part of the character probe set. Thus, the BCP (byte oriented protocols) messages are transmitted in blocks composed of a header or control field, a body or test field, and a trail or error-checking field with specialized characters used as field or block delimiters. One example of byte control protocol is the Binary Synchronous Communications Protocol (BISYNC). The "character-oriented" or "byte" type protocols, because of their nature, require a large amount of time consuming overhead operations.

In the "byte oriented" control protocol (BCP) the messages are transmitted in units called "blocks". A header field contains information that identifies the address of the message destination (or source), the job number, if any, the type of message (data or control type), the control action required, and positive or negative acknowledgment to ensure error free reception of previous messages or message. These control actions are used to reset or initialize a secondary station, to acknowledge good or bad reception of blocks, to inquire why a response or acknowledgment did not occur within a specific time period, or else to abort a transfer sequence. The control information involved is conveyed via special characters or character sequences and the text or text field of the BCP message contains any data that is being transmitted.

The "bit oriented" protocols (BLPs) may use only two or three specific control characters for monitoring operation of the data link. These characters are used to delimit the beginning (FLAG) and the end (FLAG, ABORT, or GA-go ahead) of a message frame. Upon receipt of the opening FLAG, there is a positioned significance used to delineate the bit sequence that follows into specified fields which are designated as Address, Control, Information and Frame Check Sequence fields.

The "bit-oriented protocol" messages are somewhat simpler than the byte-oriented messages. The BOP messages are transmitted also in "frames" and all the messages follow one standardized frame or format. These "bit-oriented" messages are independent of codes, line configurations and peripherals. The positional significance instead of control characters are character counts to provide one standard frame-format for all messages. In the "bit-oriented" protocol system a "frame" starts with an eight-bit FLAG sequence which is followed by sequences of: ADDRESS, CONTROL, INFORMATION, and FRAME CHECK SEQUENCE, and the frame then ends with another FLAG sequence.

In the BOP protocol the ADDRESS tells the address of the receiving station or in certain cases the address of the station which originated the frame. The CONTROL field determines the "type" of message, the send and the receive frame sequence counts and any poll commands from the primary station, in addition to commanding an addressed secondary station what operation to perform.

The INFORMATION field will involve a stream of data bits which may be configured in various code structures.

When using "synchronous" transmission over data communication lines, there may be four different types of methods of synchronization—bit, character, block, and message. Bit synchronization is achieved through a received clock signal which is coincident with a received serial data stream. "Character" synchronization is accomplished by recognizing two contiguous "phasing" characters called SYN or synchronization characters, in byte oriented operations.

In the transmission method called "serial data" transmission, this communication involves the use of a transmission line where "bits" of data are transmitted one after another in serial fashion. These serial data communications can occur in two fundamental modes. These are (i) asynchronous (not clocked) or (ii) synchronous (clocked).

In byte oriented operations, the asynchronous mode requires another method to coordinate incoming data with the receiver's internal system. Thus, an asynchronous communication network keeps its communication line in "idle" condition (generally called as Mark or binary 1 condition). Then a "start" bit precedes each transmitted character to indicate that a new character is beginning, and then one or more "stop" bits signal the end of the character and the return to the idle condition. This sequence of start bit-character data-stop bit is generally called a character or byte.

In asynchronous usage, the "character length" varies, and may range from five to eight bits depending on the code used (BAUDOT, ASCII, etc.). Error checking also can be used on each character by using an additional bit called the "parity" bit. Thus, in asynchronous communication of characters, much of the time consumed involves non-information data but rather control bits, such as the start bit and stop bits.

The use of "synchronous" communication eliminates the high overhead of control bits but still requires another method for achieving synchronization. Such type of synchronous communication network transmits a clock signal along with the data bits in order to establish individual bit synchronization between devices, and the use of the mentioned SYN character.

Thus, standardized rules, called communication protocols, are used to define the transmission format whether it be asynchronous or synchronous. These complex computer-to-terminal systems utilize synchronous protocols which are either character (byte) oriented or which are bit-oriented protocols. The primary "character oriented" protocol used is called Binary Synchronous Communication. These require that transmission be in a half-duplex mode since receipt of a block must be acknowledged before another block can be transmitted.

Bit oriented protocols (BOPs) eliminate the need for half-duplex transmission and permit full duplex operation since blocks received do not have to be acknowledged each time they are sent.

Presently there are various bit-oriented protocols in current usage which are: Advanced Data Communication Control Procedure (ADCCP); High-Level Data-Link Control (HDLC); BDLC, Burroughs Data Link Control and Synchronous Data-Link Control (SDLC).

SUMMARY OF THE INVENTION

The line adapter of the present invention works in cooperation with a microprocessor which commands and services the elements of the line adapter. The line adapter is oriented to handle bit-oriented protocol transmission and involves an input-output circuit means, composed of a timer and a bit-oriented controller chip which connect through an electrical interface EI to a data terminal or data set. A transceiver bus controller operating as a switching and routing means may alternately connect the microprocessor to the input-output circuit means or the input-output circuit means to multiplexor selection means in the line adapter. Data received from a data terminal or data set is routed through a multiplexor to microprocessor then to RAM memory means for buffer storage and conveyance to the State Machine microprocessor. Data signals and control signals from the State Machine microprocessor may be conveyed to control the input-output circuit means in regard to timing functions and data control functions, in addition to providing data to an Automatic Calling Unit output register which can be used to control the automatic dialing of remote terminals.

BRIEF DESCRIPTION OF THE DRAWINGS

FIG. 3 is a block diagram of the microprocessor used to manage and control the line adapter;

BIT ORIENTED LINE ADAPTER DESCRIPTION OF PREFERRED EMBODIMENT

The "Bit-Oriented" Line Adapter is a device which is used to perform the function of interfacing a parallel digital system to a serial data communications channel employing HDLC/SDLC/BDLC line protocol. HDLC refers to High Level Data Link Control as developed by the International Organization for Standardization (ISO). SDLC refers to Synchronous Data Link Control as developed by IBM Corp. The term BDLC refers to Burroughs Data Link Control as developed by the Burroughs Corp., Detroit, Mich.

The Line Adapter is operated under the control of the State Machine 600 of the Line Support Processor (LSP). The LSP also sometimes called a Frame Recognition-Data Link Processor, FR-DLP.

The major elements of the Bit Oriented Line Adapter are; (FIG. 2):

(a) 2048 words of RAM
(b) A Bit-Oriented Controller (BOC) chip
(c) A Timer chip which generates time references as required by the Line Support Processor and the clocks required by the Bit-Oriented Controller (BOC).
(d) Logic Circuitry to implement the automatic dialing function.
(e) A Transceiver.

The Bit Oriented Line Adapter can exist in two versions: (i) a "Quad" version (FIG. 2) which contains four complete adapters on one profile card of chips, and (ii) a "Dual" or single version which is simply a diminished quad card.

Figure 2:
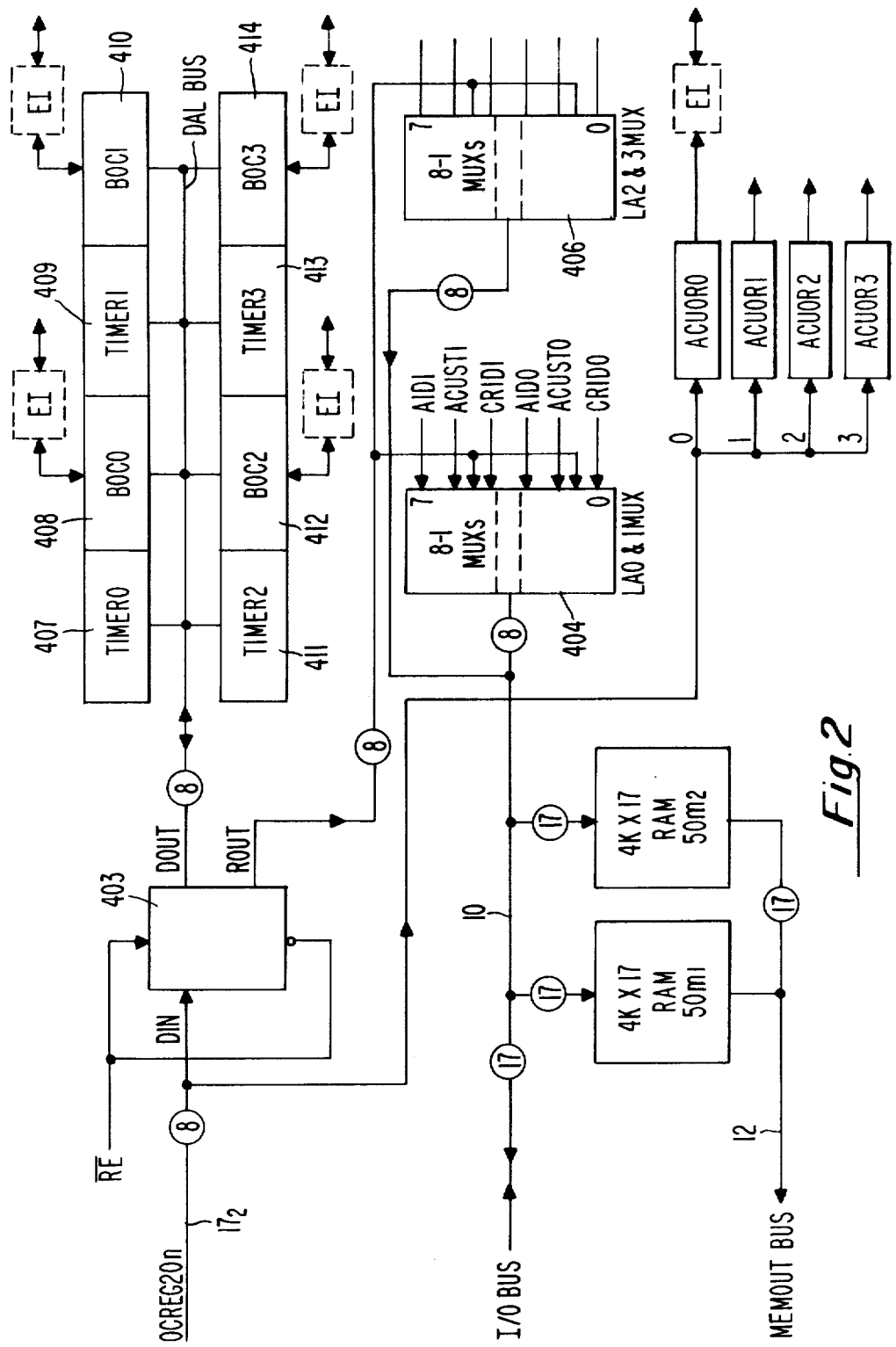
FIG. 2 is a block diagram of a bit-oriented line adapter in the multiple or quad version.

Each adapter section of a Quad card or a Dual-Quad card is cabled to a "line interface card" (Electrical Interface, EI, FIG. 2) which converts the TTL level of the adapter to the levels required by the communications channel. A unique line interface exists for each kind of electrical interface. Line Adapter Organization: FIG. 2 is a block diagram of the "Bit Oriented" Line Adapter 400 in the version called the Quad Line Adapter card.

A transceiver 403 receives input data on line 17$_2$ which is designated as the DIN or data input line. This line comes from the second Output Control Register 38 of the State Machine Processor 600 shown in FIG. 3.

Since this Line Adapter is a "Quad", there are four BOC's or Bit Oriented Controllers 408, 410, 412, and 414, each connecting to a separate electrical interface EI (each of which connects to its own data comm line or modem or data set). Likewise there are 4 Timers 407, 409, 411 and 413 which operates with the respective Bit Oriented Controllers. The Bit Oriented Controllers have a data access line (DAL) bus which connects to the Transceiver 403 by means of line DOUT (data out line).

Also connecting to the Transceiver 403 is the Read Enable signal (RE) from the State Machine Processor 600. The Transceiver 403 also has an output line designated ROUT (Read-Out) which line provides input to multiplexors 404 and 406. Since this is a Quad Line Adapter unit, the element 404 represents two multiplexors while the element 406 represents two more multiplexors for a total of four. The I/O bus 10 of the State Machine Processor connects, in FIG. 2, to "external" RAM memories $50_{m1}$ and $50_{m2}$ in addition to both multiplexors 404 and 406. The output of the RAM memory $50_{m1}$, $50_{m2}$ connects to the Memory Out bus 12, which enters the State Machine Processor of FIG. 3.

The data from the Second Control Register 38 of the State Machine Processor 600 enters on line $17_2$ and also connects to the Automatic Calling Unit Output Register (ACUOR) 405. Since this is a Quad Line Adapter, there are actually four ACU registers designated 0,1,2,3, on FIG. 2. The output of each of these Automatic Calling Unit registers feeds to an electrical interface (EI) which connects to a Automatic Calling Unit.

In FIG. 2 the ROUT line feeds input data to multiplexors 404 and 406. In addition, multiplexors 404 and 406 receive a series of input control signals which are associated with each separate data communication line.

The Transceiver 403 consists of 4 pairs of 3-state logic elements which are configured as Quad bus drivers/receivers along with separately buffered Receiver Enable and Driver Enable lines. A typically preferred integrated circuit package which embodies these features is built by the Signetics Company of Sunnyvale, Ca. and designated as the 8T26 3-state Quad Bus Transceiver. RANDOM ACCESS MEMORY: In the Bit-Oriented Line Adapter in the Quad versions of FIG. 2, the Quad BOC (bit-oriented controller) has 8,192 words of RAM (memory) which are portioned equally among the four adapter sections. The memory consists of 34 static RAM ICs (each of 4,096X1) which provide a total of 8,192 words of memory or 2,048 words per each adapter section. Each word is 17-bits long and includes 1 parity bit.

The Random Access Memory $50_{m1}$, $50_{m2}$ (RAM) is used to hold programs, tables and data required by the Line Support Processor (LSP) to service each adapter. Except for the Line Adapter Designate Logic, FIG. 5 (which is used to select a 2,048 word page of RAM as well as to select other addressable elements associated with a particular adapter section) the memory is essentially independent of the remaining logic on the card. Since the 180 nanosecond read-access time of the RAM exceeds the 125 nanosecond clock period, the memory operations require two clock periods.

BIT-ORIENTED CONTROLLER (BOC)

The BOC is a MOS/LSI device housed in a 40 pin Dual-In-Line package and is TTL (Transistor-Transistor Type Logic) compatible on all inputs and outputs. In the Quad Line Adapter of FIG. 2, there are four Bit-Oriented Controllers 408, 410, 412 and 414. The BOC is composed of registers, receivers, transmitters, and command registers which are described and illustrated in a Western Digital Corp., brochure entitled SD 1933 Synchronous Data Link Controller. These elements will be summarized hereinafter.

The BOC implements the BDLC/SDLC (Burroughs Data Link Control/Synchronous Data Link Control) protocol including zero insertion and deletion, FCS (Frame Check Sequence) generation and checking, automatic detection of special control characters (e.g., FLAG, ABORT, INVALID AND IDLE). The following Table is a brief description of the particular "Frame", which is the basic unit of information transfer in HDLC/SDLC/BDLC;

TABLE I-1

| FLAG | ADDRESS | CONTROL | INFO FIELD | FRAME CHECK SEQUENCE | FLAG |
|------|---------|---------|------------|---------------------|------|

| Where: | |
|--------|--|
| FLAG = | 01111110 |
| Address field | one or more 8 bit bytes defining the particular station |
| Control field | one or two 8 bit bytes |
| Information field | Any number of bits (may be zero bits) |
| Frame check Sequence | 16 bit error checking field |

Automatic zero insertion on transmission prevents the occurrence of more than five consecutive "ones" between flags. Inserted "zeros" are deleted by the Receiver. The major elements of the Bit-Oriented Controller (BOC) are:

(i): Receiver Register;
(ii) Reciver Holding Registers;
(iii): Comparator;
(iv): Transmitter Holding Register;
(v): Transmitter Register;
(vi): Command Register.

These six elements of the Bit-Oriented Controller are discussed hereinbelow:

(i) Receiver Register: This is an 8-bit register which inputs the received data at a clock rate determined by the Receiver clock. The incoming data is assembled to a 5, 6, 7 or 8-bit "character length" and then transferred to the Receiver Holding Register (RHR). At this time the Data Request Input (DRQI) is made active thus informing the State Machine 600 at the Line Support Processor (LSP) that the Receiver Holding Register (RHR) contains data.

(ii) Receiver Holding Register; (RHR): This is an 8-bit parallel register which presents assembled receiver "characters" to the data bus lines when activated via a "Read" operation. When the Receiver Holding Register is read by the State Machine, then the DRQI is made inactive (DRQI is the Data Request Input signal).

(iii) Comparator: This is an 8-bit Comparator which is used to compare the contents of the Address Register (in BOC chip) with the address field of the "incoming frame". This feature is enabled by a bit in the Command Register (vi). If it is enabled and there is a match, then the received frame is inputted and DRQI's are generated. If enabled and there is no match, the received frame is discarded. If not enabled, all received frames are inputted to the State Machine of the Line Support Processor (LSP).

(iv) Transmitter Holding Register: This is an 8-bit register which is loaded with data from the data bus by a "Write" operation. DRQO (Data Request Output) is also reset by the "Write" operation. The data is transferred to the Transmitter Register when the transmitter section is enabled, and the Transmitter Register is ready for new data. During this transfer, data register output (DRQO) is made active in order to inform the State Machine that the Transmitter Holding Register (THR) is again empty.

(v) Transmitter Register: This is an 8-bit register which is loaded from the Transmitter Holding Register (THR) and which is serially shifted out to the Transmit Data Output. An ABORT or a FLAG may be loaded into this register under program control.

(vi) Command Register: The command register consists of three 8-bit registers which define the command which is presently in process (e.g., DATA, ABORT, FLAG OR FCS) and it also specifies various other factors defined hereinbelow.

Command Register #1: This is the first three 8-bit registers which is organized according to bits 10–17 as shown in the Table below.

TABLE I-2

| COMMAND REGISTER 1 | | | | | | | |
|---|---|---|---|---|---|---|---|
| CR17 | CR16 | CR15 | CR14 | CR13 | CR12 | CR11 | CR10 |
| ACT REC | ACT TRAN | TC1 | TC0 | TBL1 | TBL0 | DTR | SPCL OUT |

Bit #17 of the Command Register "1" is designated CR17 and is used as "activate Receiver" bit. This bit when set activates the Receiver which begins searching for frames.

The bit designated CR16 is called "activate Transmitter". This bit, when set, activates the Transmitter and sets RTS (Request to Send). Transmission begins when CTS (Clear to Send) is received. In the "Go-Ahead" mode, the Transmitter waits for a Go-Ahed (0 followed by 7 ones) before executing the command. At the completion of any transmitter command, RTS will drop coincident with the start of the last transmitted bit. To insure that the last transmitted bit clears the data set, RTS is delayed 1-bit-time by means of logic external to the BOC.

The Command Register #1 bits 14 and 15 are Transmitter Commands (TC) which indicate the type of data to be sent according to the Table shown below:

TABLE I-3

| CR15 | CR14 | | |
|---|---|---|---|
| TC1 | TC0 | COMMAND | ACTION |
| 0 | 0 | DATA | DRQO ... Data Request-out |
| 0 | 1 | ABORT | INTRQ... |
| 1 | 0 | FLAG | INTRQ... } Interrupt Request |
| 1 | 1 | FCS | INTRQ... |

Explanation of Table:

DATA: While this command is active, the Transmitter Holding Register (THR) is transferred into the TR (if the THR is loaded and the TR is done shifting out any previous data). When the THR data is transferred to the TR, a DRQO is generated indicating that the THR is empty. If the THR has not been loaded with a new byte by the time the TR is shifted out, then an INTRQ with the XMIT-Underrun Error bit set is generated and ABORTs are sent without subsequent INTRQs.
When the DATA command is executed while not in a frame and the THR is not loaded, continuous FLAGs without INTRQs will be sent if the AUTO FLAG option is chosen; otherwise continuous ABORTs without INTRQs will be sent until the command is changed or until the THR is loaded.
ABORT: Upon receipt of this command, an ABORT TABLE I-3-continued sequence (8 ones) is loaded into the TR and XMIT operation complete is generated (INTRQ = 1). After the interrupt has been serviced, the command may change. If a new command has not been received by the time the last bit is out of the TR, then another ABORT sequence is loaded into the TR and another interrupt is generated. This sequence continues until the command is changed.
FLAG: Upon receipt of this command, a FLAG (01111110) is loaded into the TR (transmitter register) and "XMIT operation complete" is generated (INTQ = 1). After the interrupt has been serviced, the command may change. If a new command has not been received by the time the last bit is out of the TR, then another FLAG is loaded into the TR and another interrupt is generated. This sequence continues until the command is changed.
Frame Check Sequence (FCS): Upon receipt of this command, the Residual Byte (which the chip automatically transfers into the Transmitter Holding Register, THR) will be sent provided RES2−RES0 NEQ = 0. Following the Residual Byte there will come the FCS, then a FLAG along with an INTRQ (XMIT operation complete) thus ending the frame. After the interrupt has been serviced, the command may change. If the FCS command is executed while not in a frame, and if AUTO FLAG is not chosen, the Transmitter will send ABORTs without INTRQs. If AUTO FLAG is chosen, continuous FLAGs with INTRQs will be sent.

The Command Register #1 bits 13 and 12 are used as shown in the Table below. The Command Register bit 12 is designated as "Transmitter Byte Length" (TBL) and these bits designate the number of bits per data byte. Each data byte may be 5, 6, 7 or 8 bits long.

TABLE I-4

| (CR13) TBL1 | (CR12) TBL0 | Bits Per Data Byte |
|---|---|---|
| 0 | 0 | 8 |
| 0 | 1 | 7 |
| 1 | 0 | 6 |
| 1 | 1 | 5 |

The Command Register #1 bit 11 designated CR11 is the DTR command; this bit controls the "Data Terminal Ready" (DTR) signal. The DTR, as seen at the data set, will be "on" when bit CR11 is "set" except when the Self-Test mode is selected (that is, when bit CR21 of Command Register #2 is set).

Bit 10 designated CR10 is the "Special Out" bit: this bit controls the Special Out line to the Line Interface card where its name is then charged to Dial Mode (DM). Dial Mode is used in conjunction with DTR for dialing with a Burroughs Auto-Dialing Data Set. DM will be "on" when CR10 is set.

Command Register #2: This Command Register is illustrated by the Table below:

TABLE I-5

| COMMAND REGISTER 2 | | | | | | | |
|---|---|---|---|---|---|---|---|
| CR27 | CR26 | CR25 | CR24 | CR23 | CR22 | CR21 | CR20 |
| CONTROL BYTES | ADDR COMP | EXT ADDR | RBL1 | RBL0 | GA | SELF TEST | AUTO FLAG |

The bit 27 designated as Command Register bit 27 (CR27) represents the number of control bytes. This bit defines the number of control bytes per frame: a "1" specifies two control bytes while a "0" specifies one control byte.

The bit 26 designated CR26 is an "Address Compare Enable" bit. This bit when "set" causes the Receiver to inspect the first incoming address byte. If there occurs: (1) a match with the address register or (2) the address is all ones, then the rest of the frame is inputted. Otherwise the Receiver searches for a new frame. If not set, then all frames are inputted.

The bit 25 designated CR25 is the "Extended Address Enable" bit. This bit will cause the receiver to input another address byte if the least significant bit of the current address byte is "zero".

The bits of CR24 and CR23 are the "Receiver Byte Length" bits (RBL). These bits specify the byte size of a received I-frame. The I field bytes may be 5, 6, 7 or 8 bits long.

TABLE I-6

| (CR24) RBL1 | (CR23) RBL0 | Bits Per Byte |
|---|---|---|
| 0 | 0 | 8 |
| 0 | 1 | 7 |
| 1 | 0 | 6 |
| 1 | 1 | 5 |

In Table I-5, the bit CR22 is the "GO-AHEAD" bit. This bit when "set" causes the BOC to work in the "Go-Ahead" mode as used in a loop type configuration. "Loop operation" (in the bit-synchronous mode) is a method of line operation in which several stations are connected together in a loop, such that each secondary station must "pass on" all frames which are not addressed to it.

The 21-bit designated as CR21 is the "Self-Test Mode" bit. This bit, when set, deactivated the DTR and causes the Transmitter output to be connected to the Receiver input internally within the BOC chip. This data is also seen at the transmitted data line.

The bit-20 designated CR20 is the "Auto Flag" bit. Here the Transmitter will send continuous flags without INTRQs if the bit CR20 is "set", and the DATA command (CR15, CR14="00") is executed while not in a frame and THR is not loaded. If CR20 is not set, but the other two conditions are met, then continuous ABORTs without INTRQs will be sent until the command is changed or the THR (Transmitter Holding Register) is loaded. The purpose of this bit is to eliminate the necessity of executing a FLAG command at the beginning of a frame.

Command Register #3: This register includes bits 30 through 37 and is shown on the Table below.

TABLE I-7

| COMMAND REGISTER 3 | | | | | | | |
|---|---|---|---|---|---|---|---|
| CR37 | CR36 | CR35 | CR34 | CR33 | CR32 | CR31 | CR30 |
| UNUSED | UNUSED | UNUSED | UNUSED | UNUSED | RBL2 | RBL1 | RBL0 |

As seen above, the bits 33-37 are not used, however bits CR30, CR31, CR32, are used to determine what length the Residual Byte will be. This is shown in the Table hereinbelow.

TABLE I-8

| CR32 | CR31 | CR30 | |
|---|---|---|---|
| Res2 | Res1 | Res0 | Resident Byte Length |
| 0 | 0 | 0 | no residual byte sent |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

If no Residual Byte is to be sent, then the bits CR30-CR32 must be set to "0".

To end a frame, the following three actions must be done within 5 transmit clocks following the turn-on of DRQO. This may be done however in any order, as follows:

1. load Transmitter Holding Register (THR) with the last character or the residual.
2. load CR3 with the Residual Byte length.
3. change the Transmitter Command to FCS.

Status Register: The Status Register is organized as shown below using register bits 0-7. The Table hereinbelow will show their usage.

TABLE I-9

| STATUS REGISTER | | | | | | | |
|---|---|---|---|---|---|---|---|
| SR7 | SR6 | SR5 | SR4 | SR3 | SR2 | SR1 | SR0 |
| RI | CD | DSR | SPCL IN | RCV IDLE | AF/or IF/RES2 | ORUN/ RES1 | CRC1 RES0 |

SR7 - RING INDICATOR        SR5 - DATA SET READY
SR6 - CARRIER DETECT        SR4 - SPECIAL IN
                            MISCELLANEOUS

Miscellaneous bits here are bits 4, 5, 6, 7 which will be "set" when the signal they represent, as seen at the Data Set, is "on". "Special In" (SPCL IN) is used with the "Byte-Oriented" Line Adapter for Reverse Channel Receive, or Restraint Detected. Neither of these functions are applicable to the "Bit-Oriented" Line Adapter. Consequently, "Special In" is unused and thus SR4 will always be in the "reset" state.

Bit-3 designated SR3 is the "Receive Idle" bit. This bit is set when 15 "ones", denoting a station IDLE condition, have been received.

The bits of the Status Register designated "0→2" (SR0, SR1, SR2) are used as the "Received Error Bits/Residual Count bits. If a Received End of Message (REOM) without errors is received, then the bits SR2-SR0 indicate the number of residual bits on the last byte according to the following Table:

TABLE I-10

| RESIDUAL COUNT (BINARY VALUE OF SR2-SR0) | SPECIFIED BYTE LENGTH | | | |
|---|---|---|---|---|
| | 5 | 6 | 7 | 8 |
| 0 | NA | NA | NA | 0 |
| 1 | 1 | 1 | 1 | 1 |
| 2 | 2 | 2 | 2 | 2 |
| 3 | 3 | 3 | 3 | 3 |
| 4 | 4 | 4 | 4 | 4 |
| 5 | 0 | 5 | 5 | 5 |
| 6 | NA | 0 | 6 | 6 |
| 7 | NA | NA | 0 | 7 |

For residual values other than zero, the last byte contains the residual plus a portion of the closing flag.

If a REOM with errors is received, then SR2-SR0 define the error as follows:

SR2, when "on", indicates an aborted frame or an invalid frame, that is, a frame with less than 32-bits.

SR-1, when "on", indicates an Overrun Error (DRQI not serviced) SR0 when "on" indicates a CRC error, (Cyclic Redundancy Check).

BOC Interface Control: BOC refers to the Bit-Oriented Controller.

The following signals comprise the BOC Interface Control signals: The usual state is a logic 0 (ground) when the signal mneumonic indicates inversion and is a logic 1 (plus 5-volts) otherwise:

(i): CS refers to Chip Select;
(ii): WE refers to Write Enable;
(iii): RE refers to Read Enable;
(iv): A0, A1, A2 refers to the Register Address, and these signals are Bit-Oriented Controller (BOC) signals as seen in the following Table where H (High) equals plus 5-volts and L (Low) equals ground as measured at the BOC.

TABLE I-11

| $\overline{A2}$ | $\overline{A1}$ | $\overline{A0}$ | REGISTER | |
|---|---|---|---|---|
| | | | READ | WRITE |
| H | H | H | CR1 | CR1 |
| H | H | L | CR2 | CR2 |
| H | L | H | CR3 | CR3 |
| H | L | L | RHR | AR |
| L | H | H | IR | THR |
| L | H | L | SR | — |

Service Requests (Interrupts): These signals are defined as follows:

(i) DRQI—this is the Data Request Input: this signal output, when high, indicates that the Receiver Holding Register (RHR) contains valid data. The signal DRQI causes a service request to the LSP-DLP and will be reset when RHR is reset. The signal DRQI also sets bit 2 of the Interrupt Register.

(ii) DRQO—Data Request, Output: this output, when high, indicates that the Transmitter Holding Register (THR) is empty. DRQO will be reset when a character is written into the Transmitter Holding Register but will remain high between the conclusion of data and the end of the frame. To avoid generating a continuous service request during this period, the signal DRQO is logically ended with NB8/ of the ACUOR register. The service request resulting from the signal DRQO can be dropped by writing a "one" bit in ACUOR (4:1) NB8. A service request resulting from a DRQI or INTRQ will not be suppressed by this action. The signal DRQO also sets bit 1 of the Interrupt Register.

(iii) INTRQ—Interrupt Request: this output, when high, indicates that there are one or more bits set in the bit positions 3 through 7 of the Interrupt Register. The signal INTRQ causes a service request to the LSP-DLP and will be reset when the Interrupt Register is read. The Interrupt Register is shown in Table I-12.

TABLE I-12

| INTERRUPT REGISTER | | | | | | | |
|---|---|---|---|---|---|---|---|
| IR7 | IR6 | IR5 | IR4 | IR3 | IR2 | IR1 | IR0 |
| REOM no err. | REOM errs. | XMIT opcom w/no errs. | XMIT opcom with under- run | DSC | DRQI | DRQO | INTRQ |

IR7 - RECEIVED END OF MESSAGE, NO ERRORS -
This bit is set when an End of Message has been detected without error.

IR6 - RECEIVED END OF MESSAGE, ERRORS -
This bit is set when an End of Message has been detected with errors. Errors include CRC, Overrun, Invalid Frame, and Aborted Frame as denoted by the Status Register.

IR5 - TRANSMIT OPERATION COMPLETE, NO ERRORS -
This bit is set when the command in CR1 has completed without error.

IR4 - TRANSMIT OPERATION COMPLETE, ERRORS -
This bit is set when the indicated command in CR1 has completed with an underrun error.

IR3 - DATA SET CHANGE -
This bit is set when Carrier Detect, Data Set Ready, or Ring Indicator change state, either from "off" to "on" or vice-versa.

IR2 - DRQI: Data Request-Input
IR1 - DRQO: Data Request-Output
IR0 - INTRQ: Interrupt Request NRZI Option: The non-return to zero option is under program control and is in effect whenever bit NB4/of the Auto Call Unit Output Register 405, FIG. 2 (ACUOR) is in the logic 1 state. When this option is chosen the data is encoded to the NRZI format on transmission and decoded from the NRZI format on reception. In NRZI encoding, the output remains in the same state to send a binary 1 and changes state in order to send a binary 0. Since a zero bit is automatically inserted following five contiguous "one" bits anywhere between flags, a level transition is guaranteed to occur at least one every six bits.

The essential purpose of NRZI encoding is to permit "pseudo asynchronous" operation (without "start-stop" bits) in order to eliminate the need for a device such as a synchronous Data Set, to extract the receive clock from incoming data. This permits the use of direct connect devices such as those employed by Burroughs two wire direct interface. Also NRZI encoding allows the use of asynchronous Data Sets in place of the more costly synchronous data sets (in cases where the lower data rate of the asynchronous data set is acceptable).

As with all asynchronous operations, the timing clocks must be locally generated. With the Quad "Bit-Oriented" Line Adapter, FIG. 2, the clocks are generated by a Counter/Time Chip which must be programmatically set to provide a clock rate which is 32 times the data rate.

The Quad "Bit-Oriented" Line Adapter has strap options for each adapter section. Straps are used to select between timing clocks furnished by a synchronous Data Set, when one is used (or the timing clock is generated internally if the Data Set is not used).

An additional strap provides the control signal (1X/32X) into the SDLC Controller Chip. As previously cited, a preferred synchronous Data Link Controller Chip is that manufactured by Western Digital Corp., and designated SD 1933. The 1X option should be used when operating with a "synchronous" Data Set. The 32X option should be used when operating with an "asynchronous" Data Set or when operating with direct-connect devices.

With a 1X strap setting, the SDLC controller chip (408, 410, 412, 414, FIG. 2) uses the positive transition of the receive clock as a strobe to shift in received-data and uses the negative transition of the transmit clock to shift out each bit of transmitted-data. The maximum allowable data rate is the maximum specified operating speed of the SDLC controller chip which is 1.5 MBPS (megabits per second).

With a 32X strap setting, the SDLC controller chip synchronizes itself to level transitions in the incoming data and determines the center point of the first bit by counting 16 clocks following the data transition. The center point of each subsequent bit is then established by counting 32 clocks from the center point of the receiving bit. Each level transition of the received data initializes the sequence. The maximum controller rate is approximately 47KBPS (kilobits per second).

The following Table shows the allowable options for three kinds of interfaces.

TABLE I-13

| INTERFACE | NRZI | 32X/ 1X STRAP | CLOCK SOURCE |
|---|---|---|---|
| Synchronous | Not Selected* | 1X | Data Set |
| Asynchronous Data Set | Selected | 32X | Internal |
| Direct Connect | Selected | 32X | Internal |

*NRZI may be selected provided that all stations are using the NRZI format.

Go-Ahead Option: The "Go Ahead" option is under program control and is in effect when bit CR22 of the BOC's Command Register #2 is set. The Go Ahead option is required for operation within a "loop" arrangement such as shown in the Table below.

TABLE I-14

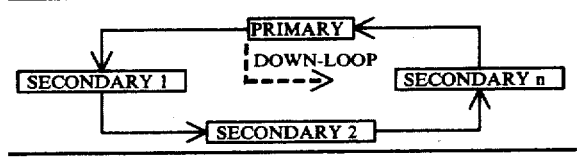

In such a system, each secondary station is a repeater for messages originating from either the primary or a lower numbered secondary station. A transmission originating from the primary is relayed from the secondary to another secondary until it returns to the primary. A secondary can also originate a transmission provided that the primary and all secondaries of lower number have relinguished the line, that is to say, they have signalled a "Go Ahead" to downstream secondaries. The "Go Ahead" consists of a "zero" followed by 7 "ones". The station relinguishing the line ends its transmission with the ending flag of the frame which is followed immediately by the "Go Ahead".

In actual practice, the primary relinguishes control of the line by following the end flag (of the last frame it is transmitting) with a single "0" bit, after which it holds the transmit line at a constant "1" level. A secondary station will see this as a "Go Ahead" and, providing it has a message to send, will suspend the repeater function and place its own transmission on the line. It will conclude the transmission by sending the "Go Ahead" pattern and then resuming the repeater function.

Whenever a secondary unit sees the "Go Ahead" pattern and wishes to transmit, it replaces the "Go Ahead" pattern by the starting flag of the frame it intends to send. This amounts to changing the eighth bit of the "Go Ahead" pattern from a "one" to a "zero". The Bit Operated Controller (BOC), when operating as a repeater, delays the data by four bits in order to obtain the time to detect the "Go Ahead" pattern and to change it to a flag if it so wishes.

The BOC (408, etc.) will generate Data Interrupts (DRQIs) on "receive" only if a match exists between the value of the address field of a frame and the value held within the Address Register.

Auto Call Operation: In usage with an 801 Auto Call Unit, the 801 ACU has a four bit interface for receiving digits of the called number to be dialed. This interface is defined by EIA Standard RS-366 and involves the following signals (FIG. 4):

*44 Call Request CRO; Data Line Occupied DLO; Present Next Digit PND; Digit Present DPR; Data Set Status DSS; Abandon Call and Retry ACR; NB8 NB4 NB2 DIGITS NB1 *11.

In the dialing sequence, the Adapter turns CRQ "on" provided that DLO is off. After detection of the dial tone (which is done by the 801) digits are transferred one at a time to the 801 units. The 801 unit converts the digit to signals which duplicate the function of rotating dial-pulse or Touch-Tone frequency compatible signals. These signals are transmitted to the telephone line. At call completion, DSS comes on to signify receipt of answer tone from the called Data Set. The receipt of DSS allows the line to be transferred to the ACU-associated Data Set. If DSS fails to come on, the Abandon Call and Retry timer (ACR) begins timing out.

With pulse dialing, a typical 10 digit number takes 15 seconds to dial; for Touch-Tone dialing the same number only requires approximately one second. The answer sequence begins sometime after the last digit has been sent by the 801 unit. There are several possible outcomes which are:

(1) voice recording on line; (2) busy signal appears on line; (3) variant code tone appears on the line. (This is a rising and fallling tone which indicates that so such telephone number is assigned); (4) Dial tone reappears on the line; (5) nothing happens; (6) Wrong number; (7) the Data Set responds.

The above items (1) through (6) imply that a retry is required. Item (7) is the only successful data call with the remote Data Set responding with an answer tone at 2,025 Hertz (for all Data Sets other than the Western Electric 103). The 103 unit responds at a frequency of 2,225 Hertz.

The 801 unit resolves the unsuccessful calls represented in items (1) through (6) through the use of an "Abandon Call and Retry" (ACR) timer. The time-out interval may be set for a minimum period of 7, 10, 15, 25 or 40 seconds by means of a screwdriver-operated switch located on the 801 unit. For most telephone-switched network operations, a period of 25 or 40 seconds is used to allow sufficient time for the call to go to completion.

Figure 4:
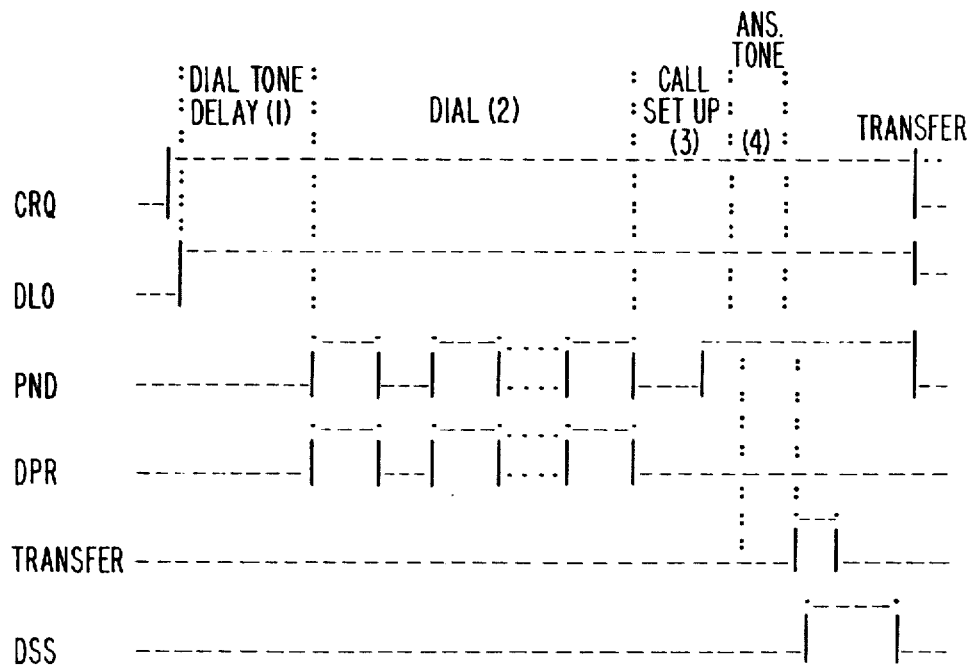
FIG. 4 is a timing diagram showing the sequence of operations for an Automatic Calling System.

Dialing Sequence: The dialing sequence for the type 801 Automatic Calling Unit (ACU) is shown in FIG. 4. In the Automatic Dialing Sequence, the dial tone (1) varies with the call (CRQ) and is usually less than 3 seconds. For pulse-type dialing, (2) present next digit (PND) is on for 100 milliseconds times the number of pulses, and then is "off" for 600 milliseconds nominally. For Touch-Touch dialing, the signal PND is "on" for 50 milliseconds, and "off" for 70 milliseconds. For call set-up (3), the ACU adapter signals the end of number by not raising (DPR) again. The Answer tone (4) is transmitted at a frequency of 2025 or 2225 Hertz.

OPERATIONS-BIT ORIENTED LINE ADAPTER (FIG. 2)

Flag Operation: Service requests are generated by both the Timer and the BOC (Bit Oriented Controller). All service requests from all adapter sections are ORed together to drive a common line. A line named FLAG 2/, which is active low, notifies the State Machine 600 that one or more line Adapters (LA) are requesting service. The State Machine of the Line Support Processor can determine which adapters are requesting service by executing a GET OP with the variant field V/FLD (4:5)=00001. The Line Adapter (LA) does not need to be designated for the executing of this OP.

A FLAG/2 which is active as a consequence of the signal DRQO being "on", can be made inactive by writing a "one" bit in ACUOR 406 (4:1) NB 8; a FLAG 2/ which is active as a result of any other service request will not be suppressed by this action.

The multiplexors 404, 406, when properly addressed, will place the state of all of the service requests associated with a designated Line Adapter onto the I/O bus 10.

Data Bus Structure: With the execption of RAM memory $50_{m1}$, $50_{m2}$ all data which is sent to addressable components in the Line Adapter (LA) will originate from the second "Output Control Register" 38 in the State Machine 600. Likewise, (with the exception of RAM) all data read by the State Machine from addressable components on the Line Adapter will go to the State Machine via the I/O bus 10.

As seen in FIG. 2, the second Output Control Register lines $17_2$ designated OCREG $20_n$ connect directly to the inputs of the Auto Call Unit Output Register 405 (ACUOR) and to the Transceiver 403.

The Auto Call Unit Output Register 405, ACUOR, is a 6-bit "D" type flip-flop register. When the clock input is enabled, data from the Second Output Register on line $17_2$ will be strobed into the Auto Call Unit Output Register 405 (ACUOR).

Data sent to both the Timer (407 et al.) and to the BOC (408 et al.) originate from the Second Output Control Register 38 in the State Machine (FIG. 3) and are sent through the quad bi-directional inverting bus driver-controller (Transceiver 403), then to the components (Timers, BOC's, Registers). Data lines for the Timer are "high" active, and for the BOC, they are "low" active. Since both components share the same data bus (DAL), data to one of the components must be inverted. Thus the Timer is used to receive the inverted data, that is, a 1 is equal to a 0 and a 0 is equal to a 1; and the Bit-Oriented Controller (BOC) receives the conventional signal format. Therefore, a "one" bit from Second Output Register 38 in the State Machine (FIG. 3) will appear as "one" bit to the BOC (active low) and as a "zero" bit to the Timer.

The Transceiver bus controller chip 403, FIG. 2, although being a tri-state device, is never used in its third or high impedance state. It is always either driving the signal DIN to the signal DOUT or else it is driving the signal DOUT to the signal ROUT, depending on the state of RE (Read Enable) signal which originates from bit 4 of the First "Output Control Register" 37 in the State Machine of FIG. 3. When bit 4 of the First Output Register is "on", the signal RE is positive and this enables the DIN-to-DOUT direction to operation through the Transceiver 403. If bit 4 is being "off", this enables the DOUT-to-ROUT direction through the bus controller Transceiver 403.

The reading of information from a Line Adapter (LA) (except the RAM read) is performed by the decoding of GET OPs, and the read information is available on the least significant eight (8) bits of the I/O bus 10. The multiplexors 404, 406 are the source of the read information.

Component Addressing: There are sixteen 8-1 multiplexors used on the Quad Line Adapter Card. Eight of these multiplexors are used for a "pair" of adapter sections. Selection of one of the 4 input groups allotted to each adapter section is determined by the value of the two least significant bits of the V-FLD of the GET OP, so that V-FLD (3:4) is equal to 11XX. The next following Table defines the various signals placed on the I/O bus 10 as a function of V-1 and V-0.

TABLE I-15

| | | | | I/O BUS LINES | | | | | |
|---|---|---|---|---|---|---|---|---|---|
| V1V0 | | 0 | 1 | 2 | 3 | 4 | 5 | 6 | 7 |
| | 00 | INRQ | PT0 | PT1 | DRQ1 | DRQ0 | — | — | RING |
| SELECTION | 01 | DATA BUS | DATA BUS | DATA BUS | DATA BUS | DATA BUS | DATA BUS | DATA BUS | DATA BUS |
| DECODE | 10 | PND | PWI | DLO | ACR | DSS | RSDN/ | CTS | SPCL IN |
| | 11 | ID0 | ID1 | ID2 | ID3 | ID4 | ID5 | ID6 | ID7 |

The data bus is shared by both the Timer and the Bit-Oriented Controller (BOC) so that five components can be handled by a 4 input multiplexor field.

Three components on a Line Adapter (LA) may be written into (not including RAM). These components are the Automatic Calling Unit Register 405 (ACUOR), the Bit-Oriented Controllers 408, 410, 412, 414 (BOC), and the Timers 407, 409, 411, 413, itself. Addressing these three components occurs in two distinct ways—one is the decode of the V-FLD of the PUT OPs and also the decode of bits from the First Output Control Register 37 in the State Machine (FIG. 3).

Figure 1:
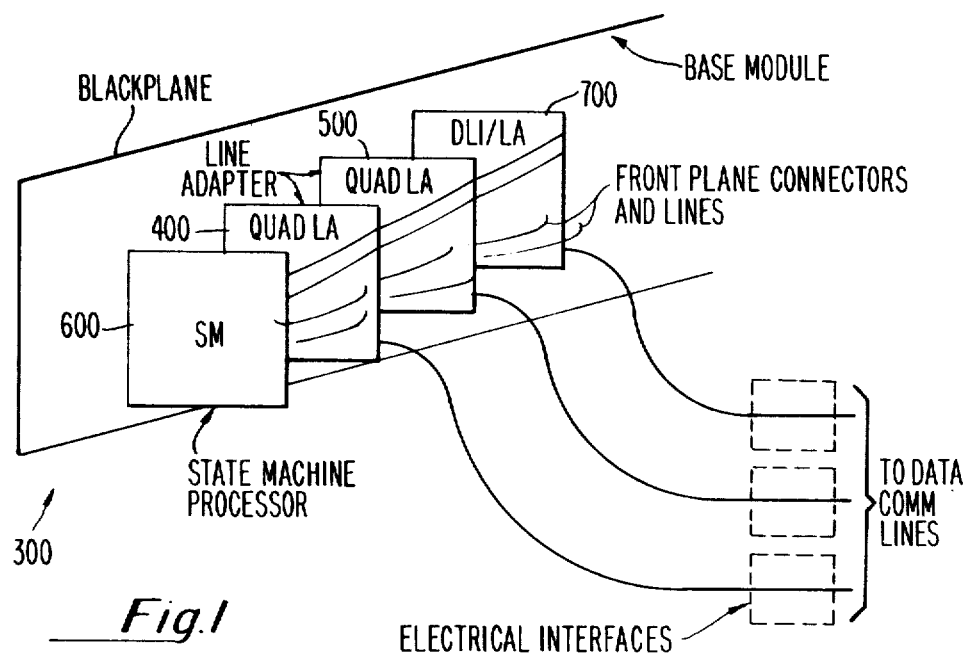
FIG. 1 is a schematic drawing of a base connection module having slide-in cards which connect multiple line adapters, a microprocessor and other interface equipment.

The Auto Call Unit Output Register 405 (ACUOR) is addressed when a 1 of 8 decoder chip decodes the PUT OP V-FLD (4:5) as equal to 01111 and PUT Strobe-2 is sent from the Line Support Processor. This decoding is performed only on the Single Line Adapter LA card, and is sent to other Line Adapter cards via the frontplane connector, FIG. 1. This decoded signal is received by a three input NOR gate in each Line Adapter whose other inputs are Clock and the Designate FF. The output of the NOR gate drives the clock input of the 6-bit ACU Output Register 405.

Data from the Second Output Register 38 of FIG. 3 will then be strobed into the Auto Call Unit Output Register 405.

Addressing a Bit-Oriented Controller (BOC) or a Timer on a "designated" Line Adapter (LA) is the same as "chip selecting" the component. This is done with bits 0 and 1 of the First Output Control Register 37 in the State Machine (FIG. 3) along with a flip-flop called the "Designate FF" on a Line Adapter.

Each Line Adapter will AND its "Designate FF" with bits 0 and 1 to provide a UCS (BOC chip Select) or a TCS (Timer chip Select) for its Bit-Oriented Controller (BOC) or its Timer.

Thus in the First Control Register 37, when the zero-bit is equal to 1, then the signal is used as a BOC Chip Select signal; when the First Control Register 37 has its one-bit equal to 1, then the signal is used to select the Timer Chip.

The remaining bits of the First Output Control Register 37 (FIG. 3) are used for control signals primarily for the BOC and the Timer.

Figure 5:
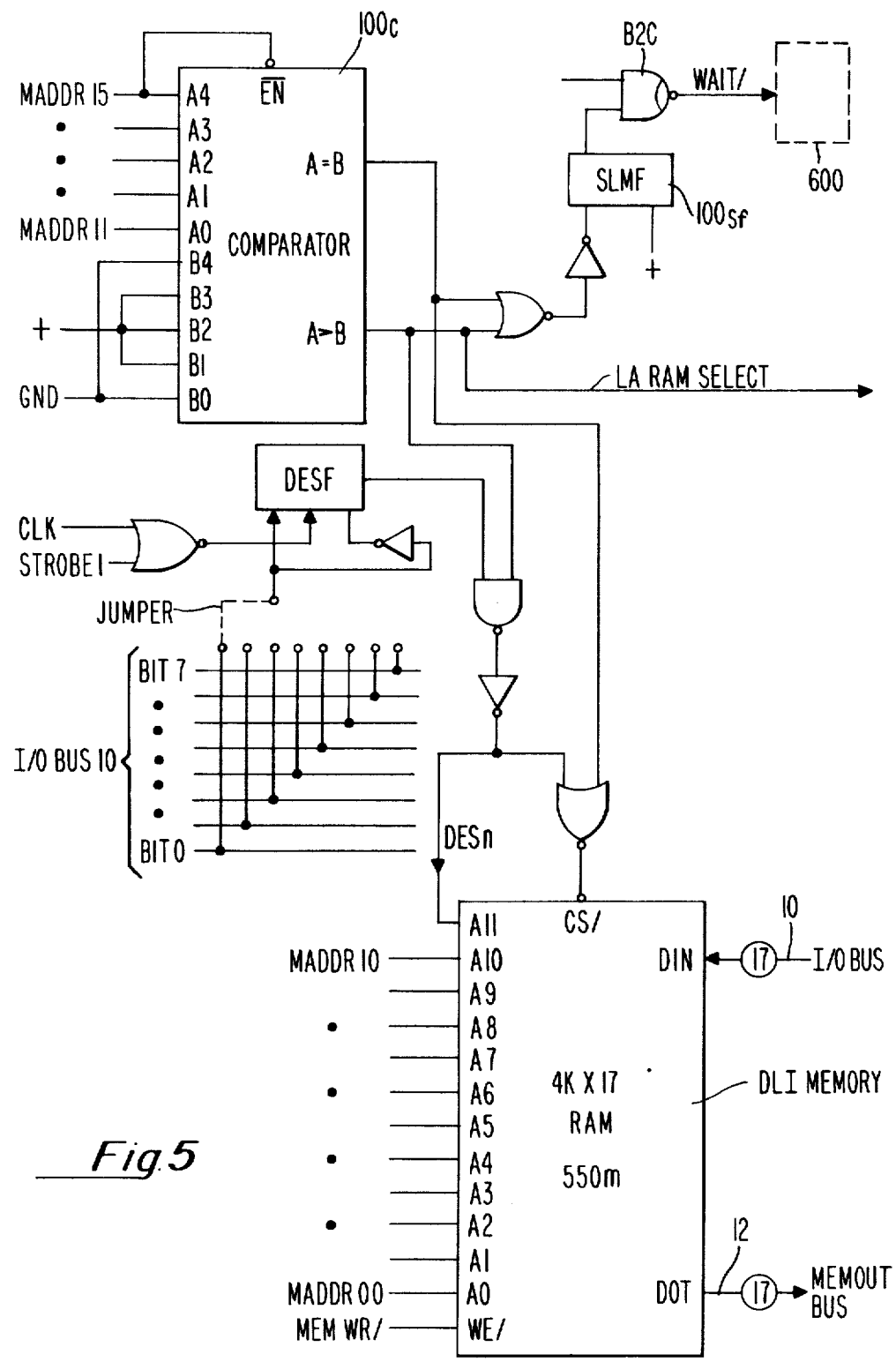
FIG. 5 is a drawing of a data link interface card which provides logic for memory selection.

Random Access Memory; (FIGS. 2, 5): The Data-Comm Line Adapter Memory (for any line) is pointed at by the memory address lines MDDR (15:5) equal to 01110, and the DLI memory, FIG. 5, is selected when the memory address lines MDDR (15:5) is equal to 01111. The signal LARMSEL will go to all Line Adapter cards via the frontplane cable to select the "designated" Line Adapter RAM memory. If memory address line MADDR is 01110 or 01111 present (DLI or LA select), then a flip-flop designated SLMF $100_{sf}$ will be set equal to 1. The flip-flop output (FIG. 5) drives an open collector NAND gate B2C whose output connects to the WAIT/frontplane signal line to the State Machine 600, FIG. 3. This signal (WAIT/) when low, will force the Line Support Processor to wait until the signal goes high. Using a RAM chip whose read-access time is 180 nanoseconds, requires the Line Support Processor's (LSP) State Machine Processor 600 to wait for 1 clock time; therefore when DLI or any Line Adapter Memory is selected, the slow memory flip-flop $100_{sf}$(SLMF) will be "on" for one clock and then toggle "off".

The Quad Line Adapter card 400, FIG. 2, contains two groups of memory chips $50_{m1}$ and $50_{m2}$ whereby DC (Data Comm) lines 0 and 1 on the card share the same group of RAM chips, and Data Comm Lines 2 and 3 share the other group of RAM chips. The signal LARAMSEL (Line Adapter RAM Select) goes to all Line Adapters and then is ANDED with the appropriate designate conditions to allow the desired RAM group to be "chip selected".

The division of RAM for the first or second data comm line on a Quad Line Adapter LA is handled by controlling the A-11 address pin on the RAM chip with a signal line DES0/A: and for the third and fourth line, the A-11 pin on the scond group of RAM chips is controlled by a signal line DES2/A. FIG. 5 shows the $DES_n$ line which is typical for all RAMs of the various Line Adapters involved.

A "Dual" or a "Single" Line Adapter will only contain one group of memory chips and will operate the same as data comm line 0 and line 1 on a "Quad" Line Adapter. Data to be written into a RAM must be placed on the I/O bus 10 by the State Machine 600; and Read data will be sent to the State Machine on the MEMOUTnn bus 12 (nn equals 00→16).

Clear: Two clearing methods are used on the Line Adapter: (i) Power-up Clear and (ii) Designate Clear.

Three components on a Line Adapter are cleared by the "Power Up" Clear: these are the (i) Designate flip-flop; (ii) Auto Call Output Register; (iii) the Bit-Oriented Controller (BOC).

There are two components on a Line Adapter which are cleared by the "Designate Clear": these are (i) Auto Call Output Register and (ii) the Bit-Oriented Controller (BOC).

When executing the "Designate Clear", the Line Adapters must be "designated", and the clear bit, (bit 7) in the First Control Register 37 must be maintained for a minimum of 1 microsecond. This is required for clearing the Bit-Oriented Controller via a pin marked as the MR pin.

What is claimed is:

1. In a line support processor for controlling data transfer operations using bit oriented protocol between a host computer and a remote data terminal wherein said line support processor includes a line adapter, a data link interface unit and a microprocessor, said microprocessor including program data in an internal PROM and external RAM storage means and having an I/O bus and output control registers providing control data to said line adapter, a bit oriented line adapter system comprising:
   (a) input/output circuit means connecting a data terminal to a first switching means;
   (b) first switching means, controlled by said microprocessor, for transferring data from said microprocessor to said input/output circuit means, or transferring data from said input/output circuit means to a multiplexor means;
   (c) multiplexor means, having an output to said I/O bus, for conveying data bytes from said input/output circuit means to said microprocessor;
   (d) memory means, connected to said I/O bus, for buffering data being transferred between said microprocessor and said data terminal.

2. The line adapter system of claim 1, wherein said input/output circuit means includes:
   (a) synchronous controller means, operatively commanded by signals from said microprocessor, for transmitting data to, or receiving data from, said data terminal;
   (b) timing means, operatively controlled by said microprocessor, for clocking of data, line-protocol-message-timing, for transmission and reception.

3. The line adapter of claim 2, wherein said timing means includes:
   (b1) first timing means for timing program-instruction operations in said synchronous controller means;

(b2) second timing means for generating the baud rate of data transfer in said synchronous controller means.

4. The line adapter system of claim 2, wherein said synchronous controller means includes:
   (a) command register means, operating upon control signals received from said microprocessor, for activating transmitter or receiver operations, and for providing flag signals to frame each sequence of address data, control data, information data, and frame check data.

5. The line adapter system of claim 2, wherein said memory means includes:
   (d1) an address input bus to receive memory address data from said microprocessor;
   (d2) a memory output bus connected to said microprocessor for reading-out addressed data from said memory means;
   (d3) I/O bus connection means for placing data into said memory means.

6. In a line support processor for controlling data transfer operations using bit oriented protocol between a host computer and a remote data terminal wherein said line support processor includes a line adapter, a data link interface unit and a microprocessor, said microprocessor including program data in an internal PROM and external RAM storage means and having an I/O bus and output control registers providing control data to said line adapter, a bit oriented line adapter system comprising:
   (a) a plurality of input/output circuit means, each of which connects a separate data terminal to a first switching means;
   (b) first switching means, controlled by said microprocessor, for transferring data from said microprocessor, to a selected one of said plurality of input/output circuit means or for transferring data from a selected one of said input/output circuit means to a multiplexor means;
   (c) multiplexor means, receiving data from said first switching means and receiving control signals from said plurality of input/output means, for transferring data from a selected one of said input/output circuit means to an I/O bus;
   (d) an I/O bus connecting the output of said multiplexor means to a memory means and to said microprocessor;
   (e) memory means connected to said I/O bus for buffering data being transferred.

7. The line adapter system of claim 6, wherein each of said input/output circuit means includes:
   (a) synchronous controller means, operatively commanded by signals from said microprocessor, for transmitting data to, or receiving data from said data terminal or said first switching means;
   (b) timing means, controlled by signals from said microprocessor, for clocking of data transmission and reception.

8. The line adapter system of claim 7, wherein each of said input/output circuit means includes:
   (a) means to request service from said microprocessor.

9. The system of claim 8, wherein said means to request service includes:
   (a) an interrupt register, in said synchronous controller, which is settable by said synchronous controller or said timing means, to indicate need for service.

10. The system of claim 9, wherein said microprocessor includes:
    (a) means for identifying which line adapter is requesting service;
    (b) means to read each interrupt register of each input/output circuit means to determine which input/output circuit means requires service.

11. The line adapter system of claim 7, wherein said input/output circuit means includes:
    (a) means to address and write control signals from said microprocessor into said synchronous controller;
    (b) means to address and write control signals into said timing means.

12. The line adapter system of claim 7, which includes:
    (a) automatic calling unit output register means connected to said output register of said microprocessor for receiving dialing signal data for operating an automatic calling unit.

13. The system of claim 10, wherein said means to read includes:
    (a) means to determine whether a selected input/output circuit means requires service to its synchronous controller or to its timing means.

* * * * *

UNITED STATES PATENT AND TRADEMARK OFFICE
CERTIFICATE OF CORRECTION

PATENT NO.   :   4,455,622
DATED        :   June 19, 1984
INVENTOR(S)  :   Richard A. Loskorn, et al.

It is certified that error appears in the above-identified patent and that said Letters Patent is hereby corrected as shown below:

```
Col.  1, line 58, change "test" to --text--.
Col.  2, line 19, change "positioned" to --positional--.
Col.  3, line  1, change "as" to --a--.
Col.  4, line 52, after "interface" insert --card type--;
         line 66, change "operates" to --operate--.
Col.  7, line 13, after "first" insert --of--;
         line 32, change "Go-Ahed" to --Go-Ahead--.
Col.  8, line 52, change "charged" to --changed--.
Col.  9, line 36, change "deactivated" to --deactivates--.
Col. 11, line 32, change "refers" to --refer--.
Col. 12, line 63, change "Counter/Time" to --Counter/Timer--.
```

Signed and Sealed this

Twenty-third Day of October 1984

[SEAL]

Attest:

GERALD J. MOSSINGHOFF

*Attesting Officer*   *Commissioner of Patents and Trademarks*